(12) United States Patent
Wei et al.

(10) Patent No.: US 12,093,442 B2
(45) Date of Patent: Sep. 17, 2024

(54) HANDHELD CONTROLLER FOR ELECTRONIC DEVICE

(71) Applicant: HTC Corporation, Taoyuan (TW)

(72) Inventors: Chang-Hua Wei, Taoyuan (TW); Yu-Ling Huang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 18/173,795

(22) Filed: Feb. 24, 2023

(65) Prior Publication Data

US 2024/0126361 A1    Apr. 18, 2024

Related U.S. Application Data

(60) Provisional application No. 63/415,299, filed on Oct. 12, 2022, provisional application No. 63/415,295, filed on Oct. 12, 2022.

(51) Int. Cl.
*G06F 3/01*       (2006.01)
*G06F 3/03*       (2006.01)
*G06F 3/0346*     (2013.01)
*H04N 23/57*      (2023.01)

(52) U.S. Cl.
CPC .............. *G06F 3/011* (2013.01); *G06F 3/017* (2013.01); *G06F 3/0308* (2013.01); *G06F 3/0346* (2013.01); *H04N 23/57* (2023.01)

(58) Field of Classification Search
CPC ........ G06F 3/011; G06F 3/017; G06F 3/0308; G06F 3/0346; H04N 23/57
See application file for complete search history.

(56) References Cited

U.S. PATENT DOCUMENTS

| | | | |
|---|---|---|---|
| 8,570,273 B1* | 10/2013 | Smith | G06F 3/03547 345/161 |
| 11,157,080 B2* | 10/2021 | Nakamura | G06F 3/014 |
| 11,330,093 B2 | 5/2022 | Backus | |
| 11,353,967 B2 | 6/2022 | Martin et al. | |
| 2006/0007151 A1* | 1/2006 | Ram | G06F 3/0395 345/163 |
| 2010/0296133 A1* | 11/2010 | Zahnert | H04N 1/00127 358/473 |
| 2012/0043452 A1* | 2/2012 | Karmatz | B25G 1/04 16/110.1 |
| 2014/0364176 A1 | 12/2014 | Pintor | |
| 2020/0112205 A1* | 4/2020 | Weisband | H02J 7/342 |
| 2021/0408670 A1* | 12/2021 | Woods, Jr. | H04M 1/0202 |

FOREIGN PATENT DOCUMENTS

| | | |
|---|---|---|
| CN | 109961624 | 7/2019 |
| CN | 213844086 | 7/2021 |
| TW | 202210145 | 3/2022 |
| WO | 2021147729 | 7/2021 |

* cited by examiner

*Primary Examiner* — Kwang-Su Yang
(74) *Attorney, Agent, or Firm* — JCIPRNET

(57) ABSTRACT

A handheld controller is adapted to control an electronic device. The handheld controller includes a first body, a second body, and a connecting portion. The first body is adapted to be held by a user's hand. The second body is connected to the first body through the connecting portion. The connecting portion is adapted to be clamped between user's fingers. A distance between the first body and at least a portion of the second body is variable.

18 Claims, 6 Drawing Sheets

HANDHELD CONTROLLER FOR ELECTRONIC DEVICE

CROSS-REFERENCE TO RELATED APPLICATION

This application claims the priority benefit of U.S. provisional application Ser. No. 63/415,299, filed on Oct. 12, 2022 and U.S. provisional application Ser. No. 63/415,295, filed on Oct. 12, 2022. The entirety of each of the above-mentioned patent applications is hereby incorporated by reference herein and made a part of this specification.

BACKGROUND

Technical Field

The disclosure relates to a controller, and in particular, relates to a handheld controller.

Description of Related Art

A user can control an electronic device through a handheld controller. When the user makes a large or intense movement, in order to prevent the handheld controller from being separated from the user's hand and further to allow the handheld controller to stay in the user's hand when not in use, the handheld controller may be fixed in the user's hand by binding the palm with a strap. However, such a method is inconvenient for the user to put on and take off the handheld controller and may easily reduce the comfort and convenience of use.

SUMMARY

The disclosure provides a handheld controller configured to control an electronic device.

A handheld controller provided by the disclosure is adapted to control an electronic device. The handheld controller includes a first body, a second body, and a connecting portion. The first body is adapted to be held by a user's hand. The second body is connected to the first body through the connecting portion. The connecting portion is adapted to be clamped between user's fingers. A distance between the first body and at least a portion of the second body is variable.

To sum up, in the disclosure, since the handheld controller is clamped by fingers to be fixed in the hand, the user can easily fix the handheld controller in the hand, and the handheld controller is not easy to fall off even if the user makes a large movement. Further, since the opening angle of the fingers is limited and the fingers bend naturally, the fingers are always kept between the first body and the second body. When the user does not need to use the handheld controller, the handheld controller can be easily fixed in the hand without falling.

DESCRIPTION OF THE EMBODIMENTS

Figure 1A:
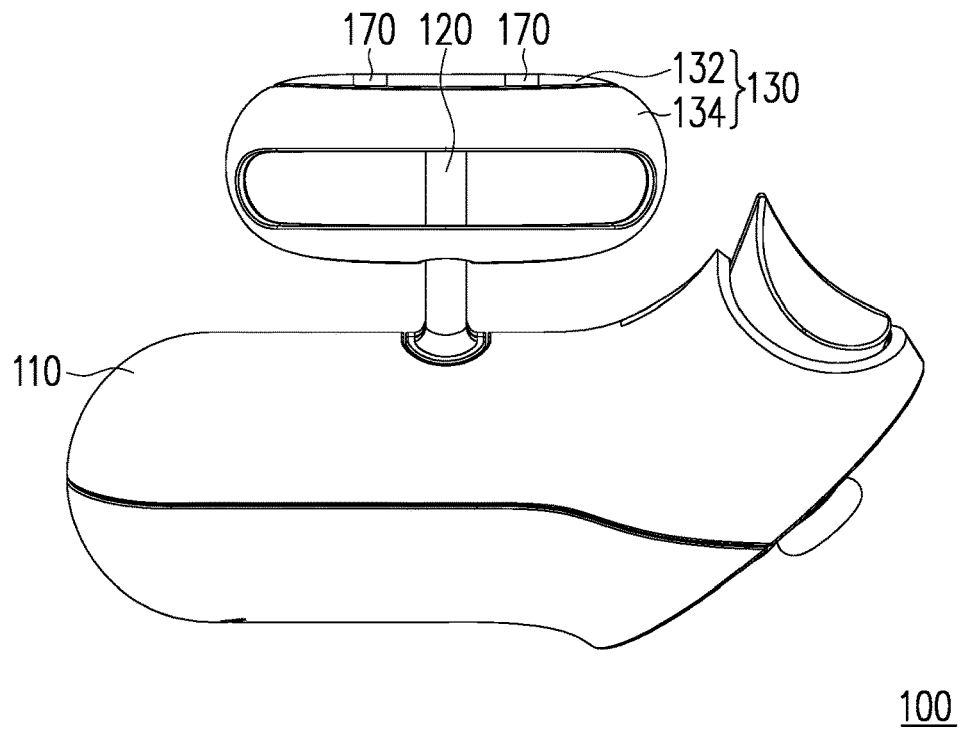
FIG. 1A is a schematic view of a handheld controller according to an embodiment of the invention.
Figure 1B:
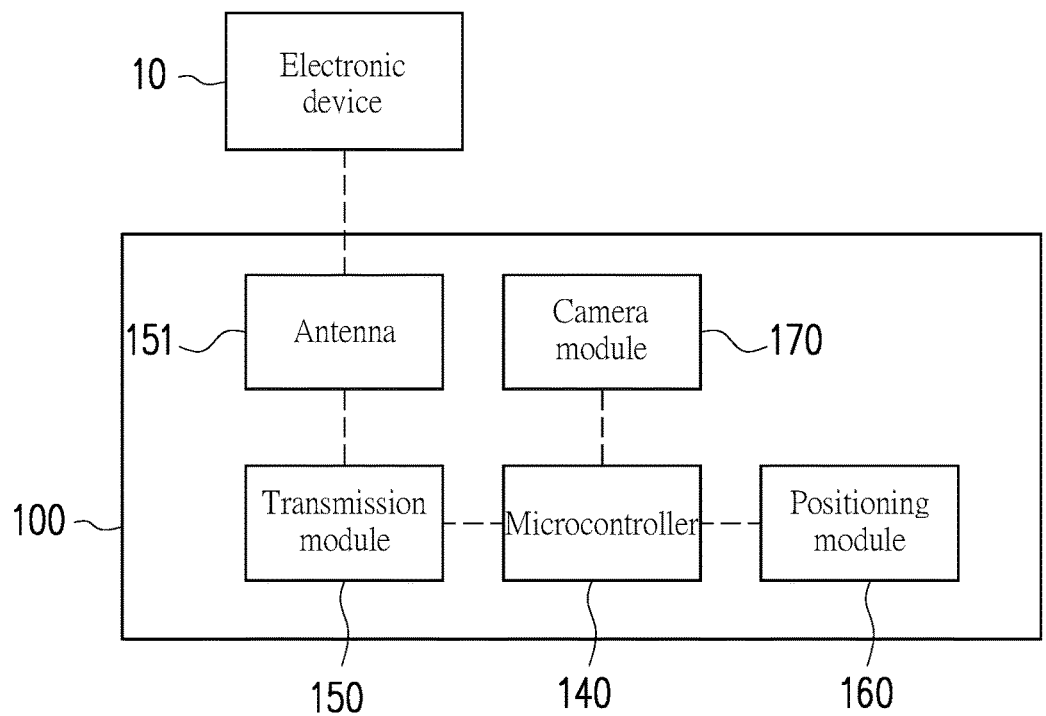
FIG. 1B is a block diagram of a control system of the handheld controller of FIG. 1A.

FIG. 1A is a schematic view of a handheld controller according to an embodiment of the invention. FIG. 1B is a block diagram of a control system of the handheld controller of FIG. 1A. With reference to FIG. 1A and FIG. 1B, in this embodiment, a handheld controller 100 is adapted to control an electronic device 10. The handheld controller 100 includes a first body 110, a connecting portion 120, and a second body 130. The first body 110 is adapted to be held by a user's hand (not shown). The connecting portion 120 is connected to the first body 110 and the second body 130. The connecting portion 120 is adapted to be clamped between user's fingers. The second body 130 is connected to the first body 110 through the connecting portion 120.

In this embodiment, the second body 130 is electrically connected to the first body 110 through the connecting portion 120, but the disclosure is not limited thereto. Since the second body 130 is electrically connected to the first body 110 through the connecting portion 120, a signal may be transmitted between the first body 110 and the second body 130 through the connecting portion 120. In this embodiment, the handheld controller 100 may further include a microcontroller 140, a transmission module 150, and a positioning module 160. The transmission module 150 is electrically connected to the microcontroller 140, and the positioning module 160 is electrically connected to the microcontroller 140. When the user uses the handheld controller 100 and moves, the positioning module 160 transmits detected positioning information to the microcontroller 140 and then transmits the detected positioning information to the electronic device 10 through the transmission module 150.

In this embodiment, the positioning module 160 may include an inertial measurement unit (IMU). For instance, the positioning module 160 may be a six-axis inertial measurement unit. The six axes include accelerometers for X, Y, and Z axes and gyroscopes for X, Y, and Z axes. The positioning module 160 may also be a nine-axis inertial measurement unit. The nine axes include accelerometers for X, Y, and Z axes, gyroscopes for X, Y, and Z axes, and magnetometers for X, Y, and Z axes. In other words, the accelerometers of the X, Y, and Z axes are used to output the acceleration values of the X, Y, and Z axes, the gyroscopes of the X, Y, and Z axes are used to output the angular velocity values of the X, Y, and Z axes, and the magnetometers of the X, Y, and Z axes are used to output the magnetic force values of the X, Y, and Z axes.

Besides, the transmission module 150 of the handheld controller 100 provided by this embodiment may further include an antenna 151, and the antenna 151 is disposed in the second body 130. When the user uses the handheld controller 100 and moves, the positioning module 160 transmits a detected signal to the microcontroller 140 and then transmits the detected signal to the electronic device 10 through the antenna 150.

Figure 2:
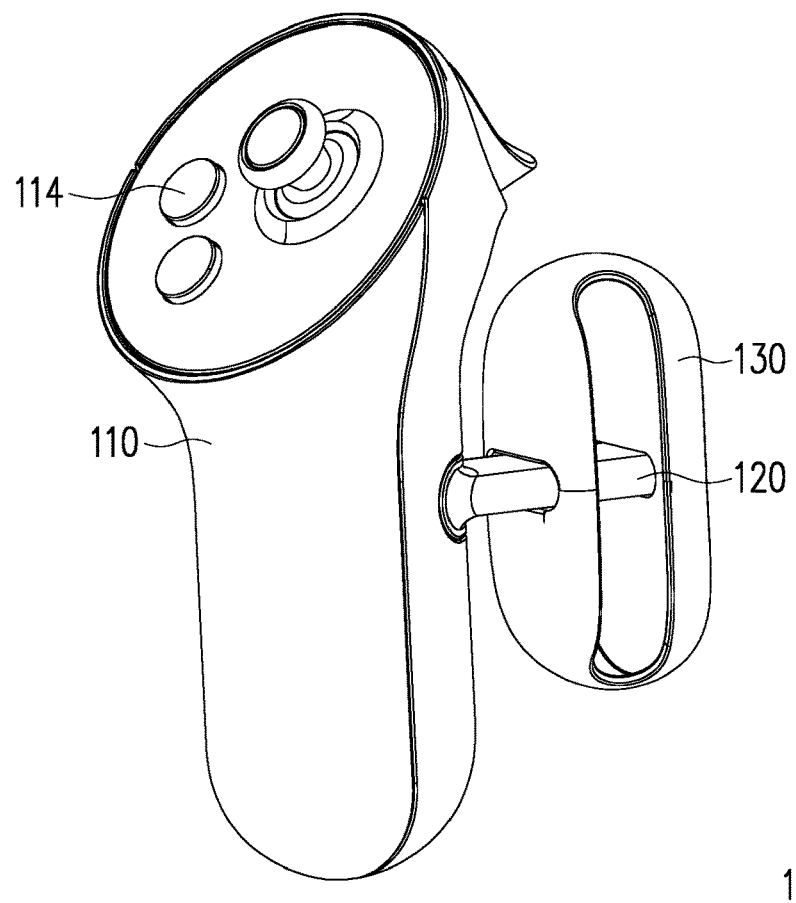
FIG. 2 is schematic view of the handheld controller of FIG. 1A being viewed from another viewing angle.

FIG. 2 is schematic view of the handheld controller of FIG. 1A being viewed from another viewing angle. With reference to FIG. 2, in this embodiment, at least one button 114 may be provided on the first body 110, so that the user can trigger a corresponding function by physically controlling the button 114 in various usage situations.

Figure 3:
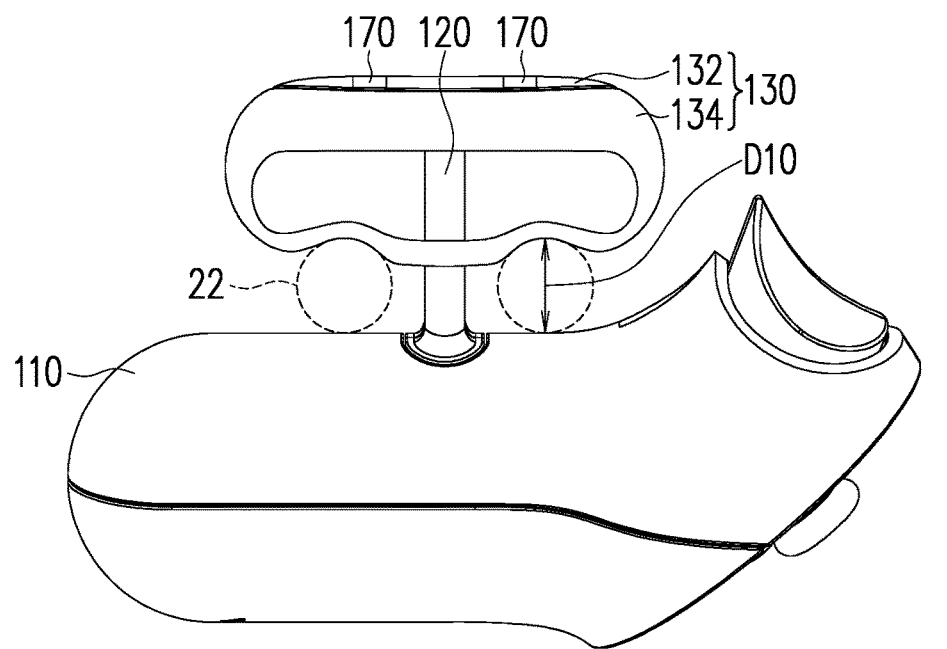
FIG. 3 is schematic view of the handheld controller of FIG. 1A being clamped in a user's hand.

FIG. 3 is schematic view of the handheld controller of FIG. 1A being clamped in a user's hand. With reference to FIG. 3, a distance D10 between the first body 110 and at least a portion of the second body 130 is variable. In the original state, the distance D10 between the first body 110 and at least a portion of the second body 130 is less than the diameter of most of the users' fingers 22. When the user inserts a finger between the first body 110 and the second body 130, the portion of the second body 130 in contact with the finger 22 can be pushed upwards by the finger 22, so that the finger 22 may be squeezed between the first body 110 and the second body 130. Further, because the distance D10 between the first body 110 and the portion of the second body 130 in contact with the finger 22 may be kept at a size that properly applies a clamping force on the finger 22, the first body 110 and the second body 130 may clamp the finger 22, so that the handheld controller 100 is fixed in the user's hand.

According to the above, the handheld controller 100 provided by this embodiment may be well fixed in the user's hand without using straps for complicated binding actions. Further, even if the user's palm is in an open state or relaxed without holding the first body 110 forcefully, the handheld controller 100 may not be easily released from the user's hand. When the handheld controller 100 is to be removed, the handheld controller 100 may also be taken off from the hand with the other hand intuitively, and an optimized using experience is thus provided.

In this embodiment, the second body 130 includes a rigid portion 132 and an elastic portion 134. The rigid portion 132 is connected to the connecting portion 120. The elastic portion 134 is connected to the rigid portion 132 and is adapted to contact the user's finger 22. That is, the elastic portion 134 is not connected to the connecting portion 120 directly. Therefore, a portion of the elastic portion 134 away from the rigid portion 132 can move relative to the connecting portion 120. A distance between the first body 110 and at least a portion of the elastic portion 134 is variable. As shown in FIG. 3, the portion of the elastic portion 134 in contact with the finger 22 is pushed by the finger 22 and deformed upwards, and at the same time, applies an elastic recovery force on the finger 22 to allow the finger 22 to be clamped between the first body 110 and the elastic portion 134.

In this embodiment, the connecting portion 134 passes through the elastic portion 134 and can provide an appropriate limiting effect on the elastic portion 134, but the disclosure is not limited thereto.

In this embodiment, the handheld controller 100 further includes a camera module 170 disposed on the rigid portion 132. The camera module 170 may be used as a detection element to detect the external environment, and since the camera module 170 is disposed on the second body 130, the camera module 170 is prevented from being blocked by fingers. When detecting a signal, the camera module 170 transmits the signal to the microcontroller 140 and transmits the signal to the electronic device 10 through the transmission module 150. In more detail, positioning information may also be generated based on an image captured by the camera module 170. Therefore, based on the positioning information generated by the positioning module 160 and the positioning information generated based on the image captured by the camera module 170, the coordinates of the handheld controller 100 in space are calculated.

In this embodiment, the distance between the first body 110 and at least a portion of the second body 130 is less than or equal to 16 millimeters (mm). Since the diameter of 95% of users' fingers is greater than or equal to 16 mm, such a distance can ensure that most of users' fingers may be properly clamped between the first body 110 and the second body 130.

In this embodiment, the connecting portion 120 is connected to the middle of the second body 130. When the user's hand holds the first body 110, the connecting portion 120 is, for example, located between the user's middle finger and ring finger, the first body 110 is located at the user's palm, and the second body 130 is located at the back of the user's palm, but the disclosure is not limited thereto.

Figure 4A:
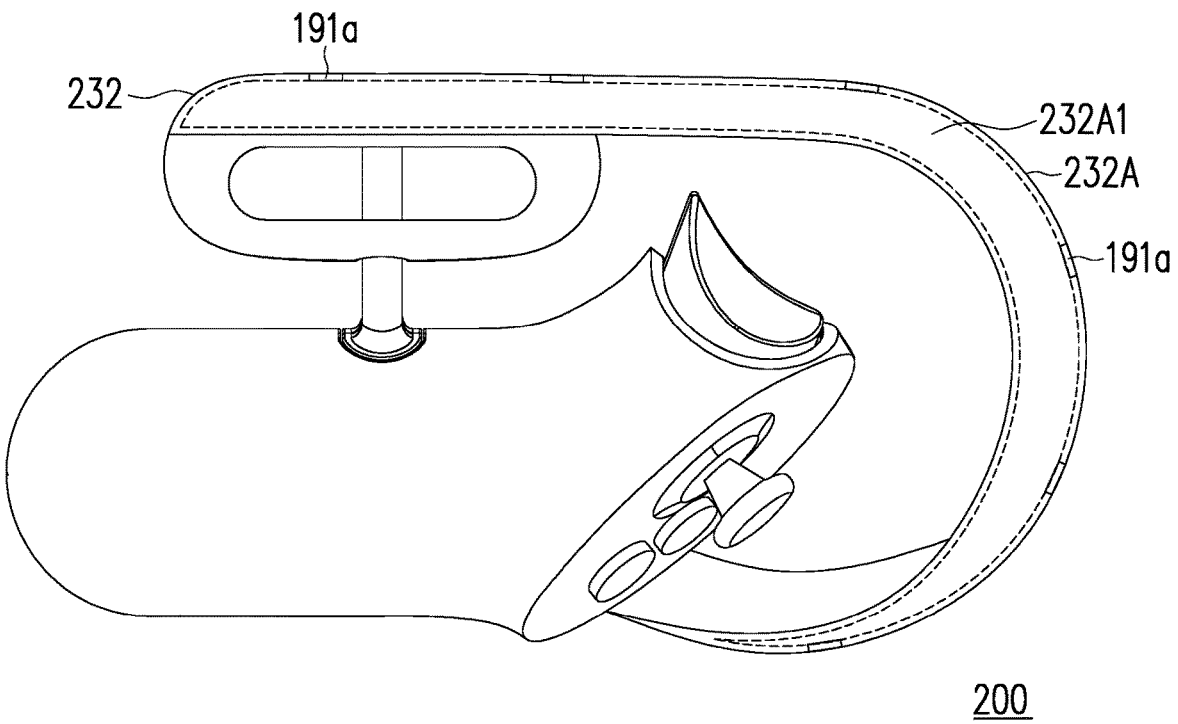
FIG. 4A is a schematic view of a handheld controller according to another embodiment of the invention.
Figure 4B:
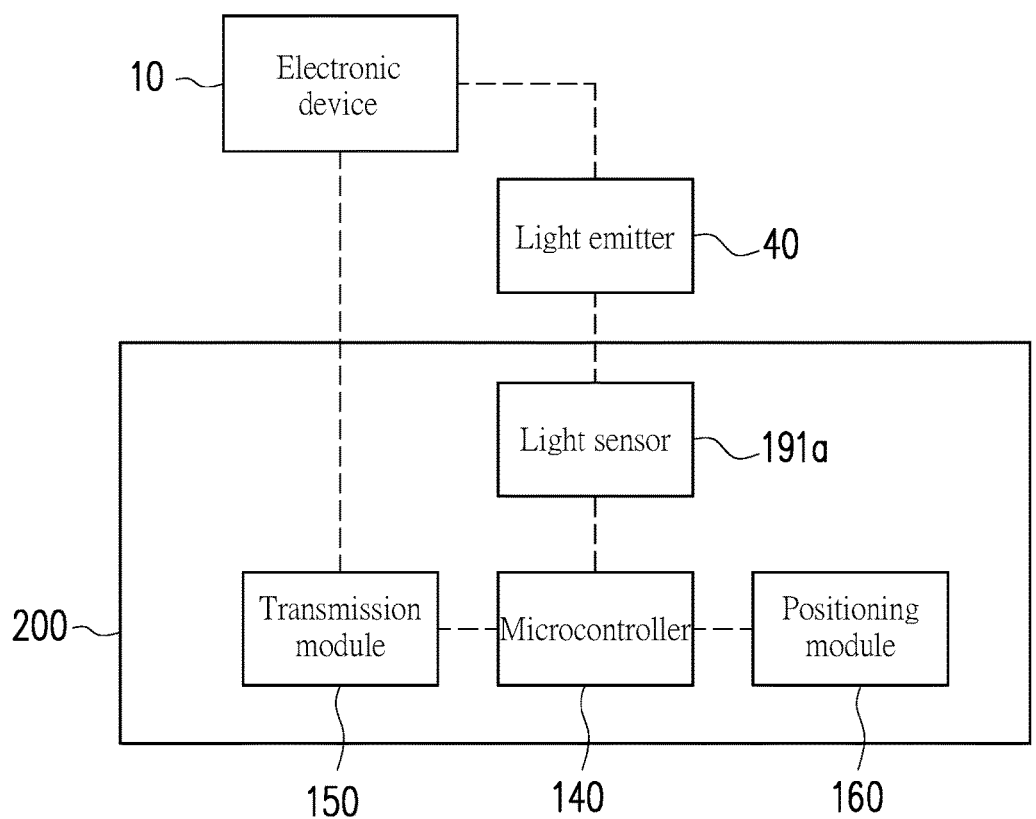
FIG. 4B is a block diagram of a control system of the handheld controller of FIG. 4A.

FIG. 4A is a schematic view of a handheld controller according to another embodiment of the invention. FIG. 4B is a block diagram of a control system of the handheld controller of FIG. 4A. With reference to FIG. 4A and FIG. 4B, a handheld controller 200 provided by this embodiment is similar to the handheld controller 100 of FIG. 1A, so only the differences between the two are described herein. A rigid portion 232 of the handheld controller 200 provided by this embodiment has an arc-shaped belt extension portion 232A connected to the first body 110. The arc-shaped belt extension portion 232A may further reduce the probability of the handheld controller 200 being dropped from the hand. A battery 232A1 is arranged in the arc-shaped belt extension portion 232A of this embodiment, so that the usage time of the handheld controller 200 may be increased.

In this embodiment, the handheld controller 200 further includes a plurality of light sensors 191a disposed on the arc-shaped belt extension portion 232A and configured to detect an external light signal. The light sensors 191a are disposed on the arc-shaped belt extension portion 232A, and in this way, the trackable volume is increased, and the light sensors 191a are prevented from being blocked during use. Optionally, the light sensors 191a may also be disposed on the first body 110. In detail, the light sensors 191a may be used to detect light signals emitted by a plurality of external light emitters 40. For instance, the light emitters 40 may emit infrared light. When the light signals emitted by the electronic device 10 through the light emitters 40 are detected by the light sensors 191a, the orientations of the light sensors 191a may be known. In more detail, since the relative positions of these light sensors 191a are fixed, the positioning information of the light sensors 191a may be calculated based on the time difference between the light signals detected by the light sensors 191a. Therefore, based on the positioning information generated by the positioning module 160 and the positioning information generated by the light sensors 191a, the coordinates of the handheld controller 100 in space are calculated.

Figure 5:
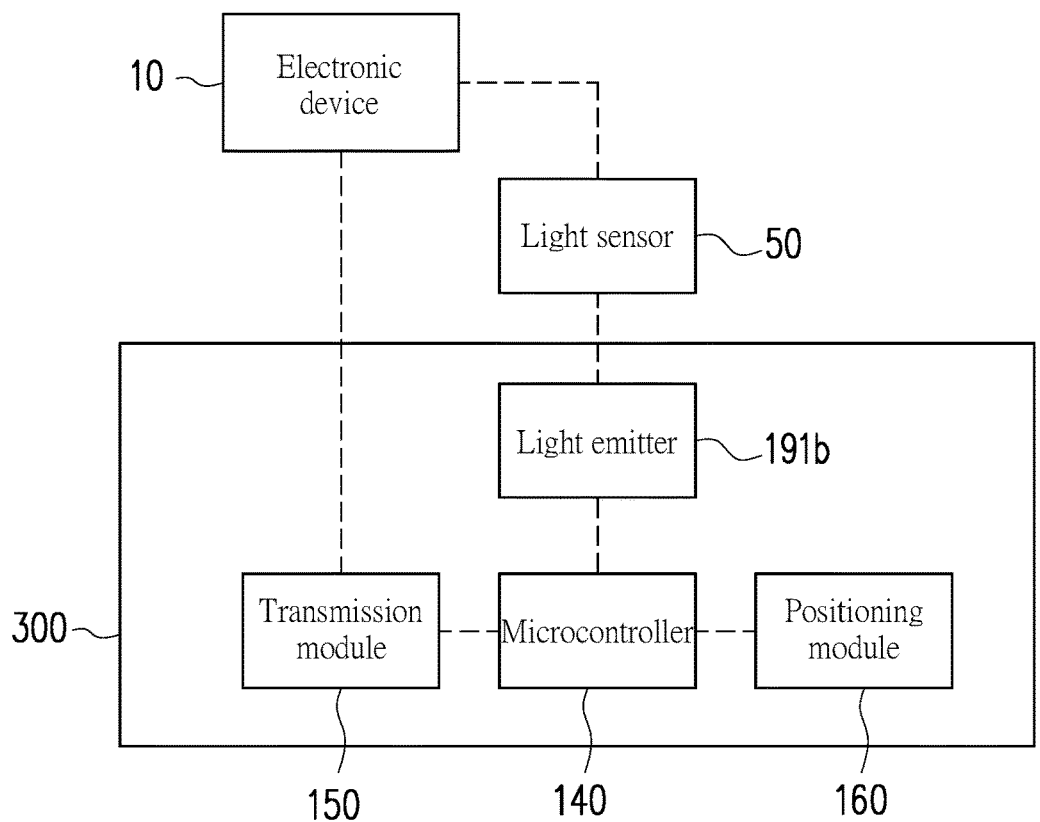
FIG. 5 is a block diagram of a control system of a handheld controller according to still another embodiment of the invention.

FIG. 5 is a block diagram of a control system of a handheld controller according to still another embodiment of the invention. With reference to FIG. 5, a handheld controller 300 provided by this embodiment is similar to the handheld controller 200 of FIG. 4B, so only the differences between the two are described herein. In this embodiment, the handheld controller 300 further includes a plurality of light emitters 191*b* disposed on the arc-shaped belt extension portion 232A as shown in FIG. 4A and configured to provide light signals to the outside. The light emitters 191*a* are disposed on the arc-shaped belt extension portion 232A, and in this way, the trackable volume is increased, and the light emitters 191*a* are prevented from being blocked during use. Optionally, the light emitters 191*a* may also be disposed on the first body 110 as shown in FIG. 4A. For instance, the light emitters 191*b* may be a point light source, an array of point light sources, or a patterned light source. In detail, the light emitters 191*b* may be used to provide light signals for detection by an external light sensor 50. When the electronic device 10 detects the light signals provided by the light emitters 191*b* through the light sensor 50 (e.g., a camera module), the orientations of the light emitters 191*b* may be known. Since the relative positions of the light emitters 191*b* are fixed, the positioning information of the light emitters 191*b* may be calculated based on the images captured by the light sensor 50. Therefore, based on the positioning information generated by the positioning module 160 and the positioning information generated by the light emitters 191*b*, the coordinates of the handheld controller 100 in space are calculated.

Figure 6:
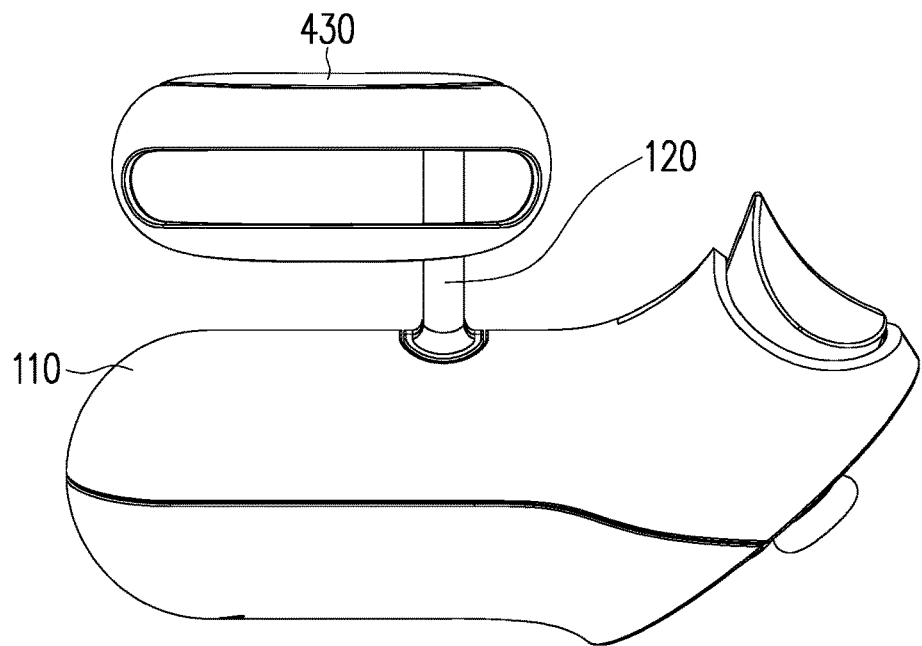
FIG. 6 is a schematic view of a handheld controller according to yet another embodiment of the invention.

FIG. 6 is a schematic view of a handheld controller according to yet another embodiment of the invention. With reference to FIG. 6, a handheld controller 400 provided by this embodiment is similar to the handheld controller 100 of FIG. 1A, so only the differences between the two are described herein. The connecting portion 120 of the handheld controller 200 provided by this embodiment is connected to one side of a second body 430 instead of the middle of the second body 430. When the user's hand holds the first body 110, the connecting portion 120 is, for example, located between the user's middle finger and ring finger, the first body 110 and the second body 430 clamp the user's ring finger and little finger together, but the disclosure is not limited thereto.

Figure 7:
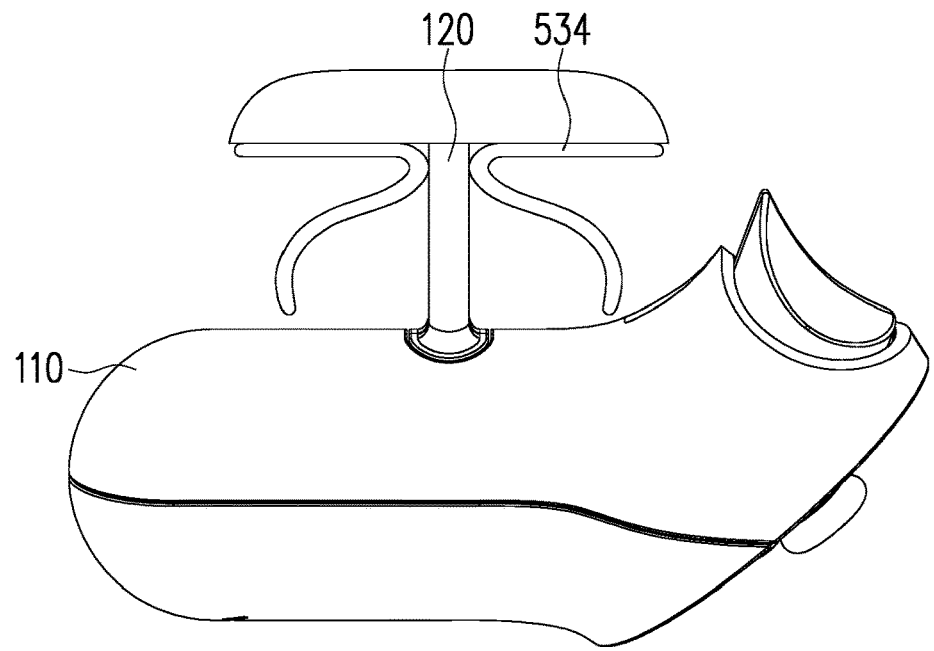
FIG. 7 is a schematic view of a handheld controller according to another embodiment of the invention.

FIG. 7 is a schematic view of a handheld controller according to another embodiment of the invention. With reference to FIG. 7, a handheld controller 500 provided by this embodiment is similar to the handheld controller 100 of FIG. 1A, so only the differences between the two are described herein. An elastic portion 534 of the handheld controller 500 provided by this embodiment is formed by folding a plate-shaped elastic material. In addition, the bent shape of the elastic portion 534 provided by this embodiment can provide a lateral limiting effect for the fingers, and the probability of the handheld controller 500 being released from the user's hand may be further reduced.

Figure 8:
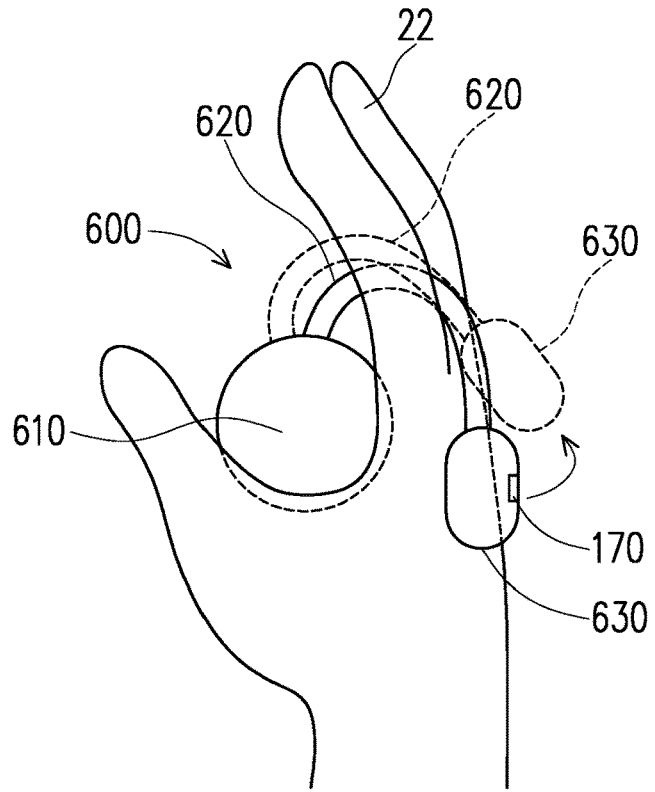
FIG. 8 is schematic view of a handheld controller being clamped in a user's hand according to still another embodiment of the invention.

FIG. 8 is schematic view of a handheld controller being clamped in a user's hand according to still another embodiment of the invention. With reference to FIG. 8, a handheld controller 600 provided by this embodiment is similar to the handheld controller 100 of FIG. 1A, so only the differences between the two are described herein. A connecting portion 620 of the handheld controller 600 provided by this embodiment is rotatably connected to a first body 610. For instance, the connecting portion 620 may be rotatably connected to the first body 610 via a torsion hinge. When the connecting portion 620 rotates, a distance between the first body 610 and a second body 630 may be changed to properly apply a clamping force to the user's hand, so that the handheld controller 600 is fixed in the user's hand. In this embodiment, when the user's fingers 22 clamp the connecting portion 620, the first body 610 is located at the user's palm, and the second body 630 is located at the back of the user's palm. That is, the first body 610 and the second body 630 clamp the user's palm, while the fingers 22 can maintain a large degree of freedom. In this embodiment, the handheld controller 600 further includes the camera module 170 as shown in FIG. 1B, and description of the camera module 170 may be found with reference to the relevant description of FIG. 1B.

Figure 9:
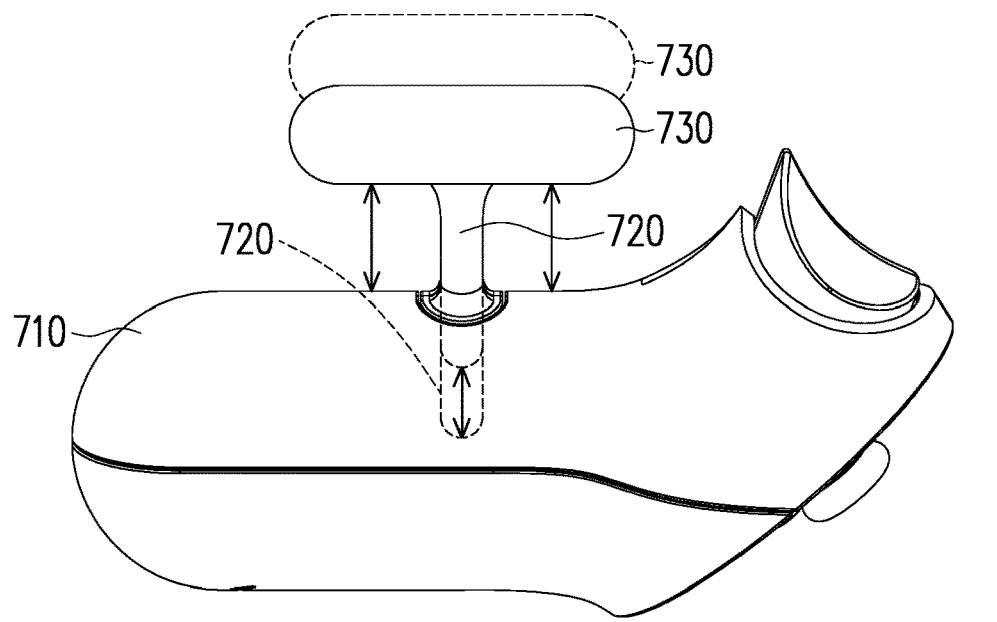
FIG. 9 is a schematic view of a handheld controller according to yet another embodiment of the invention.

FIG. 9 is a schematic view of a handheld controller according to yet another embodiment of the invention. With reference to FIG. 9, a handheld controller 700 provided by this embodiment is similar to the handheld controller 100 of FIG. 1A, so only the differences between the two are described herein. One side of a connecting portion 720 of the handheld controller 700 provided by this embodiment is inserted into a first body 710. A length of a portion of the connecting portion 720 exposed outside the first body 710 is adjustable. When the user inserts a finger between the first body 710 and a second body 730, the connecting portion 720 may be pulled outwards to increase a distance between the first body 710 and the second body 730. Next, for instance, the connecting portion 720 is pulled back by an elastic member (not shown) to apply a clamping force on the finger, so the first body 710 and the second body 730 may clamp the finger, and that the handheld controller 700 is fixed in the user's hand. In another embodiment, a multi-stage design may also be adopted, so that the distance between the first body 710 and the second body 730 may be kept at several predetermined values.

Figure 10:
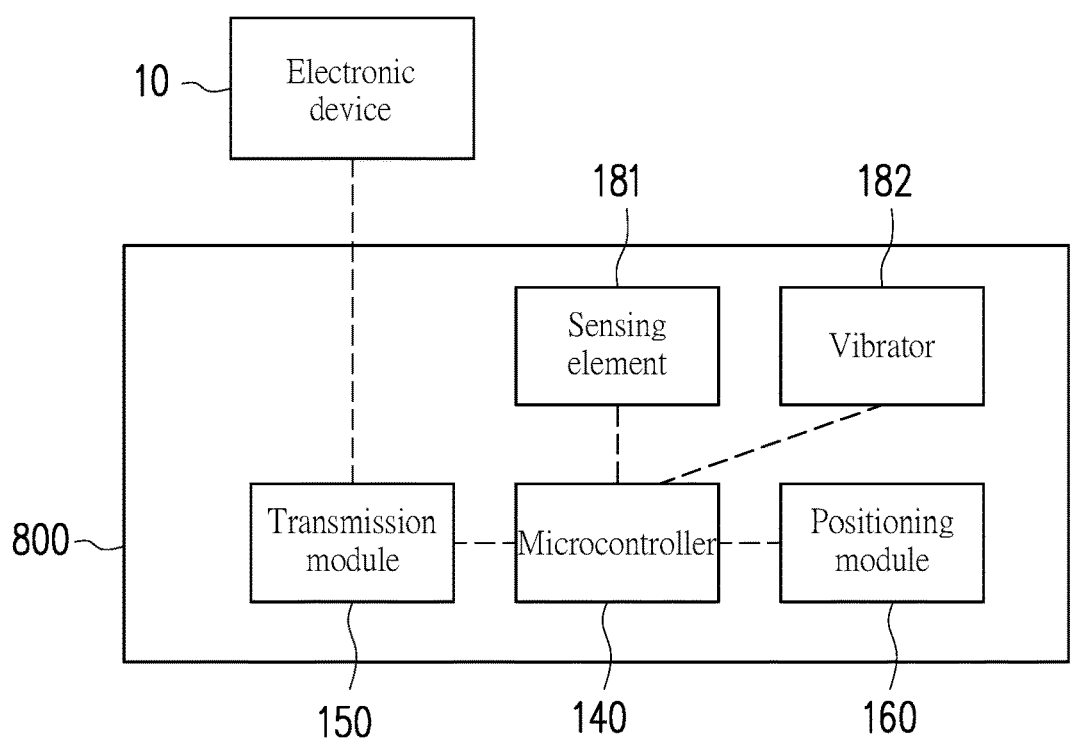
FIG. 10 is a block diagram of a control system of a handheld controller according to another embodiment of the invention.

FIG. 10 is a block diagram of a control system of a handheld controller according to another embodiment of the invention. With reference to FIG. 10, a handheld controller 800 provided by this embodiment is similar to the handheld controller 100 of FIG. 1B, so only the differences between the two are described herein. The handheld controller 800 provided by this embodiment may include a plurality of sensing elements 181. The sensing elements 181 may be at least one button, a touch module, or a biosensor. The sensing elements 181 may provide the user with finger operation selection or may detect a palm size, a finger position, or a gesture state. When the sensing elements 181 detect a signal, the sensing elements 181 may transmit the signal to the microcontroller 140 and transmit the signal to the electronic device 10 through the transmission module 150. The handheld controller 800 provided by this embodiment may further include a vibrator 182 to provide vibration for the user to feel.

In view of the foregoing, in the handheld controller provided by the disclosure, since the handheld controller may be clamped by fingers to be fixed in the hand and the distance between the first body and at least a portion of the second body is adjustable, the user can easily fix the handheld controller in the hand, and the handheld controller is not easy to fall off even if the user makes a large movement. Further, since the opening angle of the fingers is limited and the fingers bend naturally, the fingers are always kept between the first body and the second body. When the user does not need to use the handheld controller, the handheld controller can be easily fixed in the hand without falling. When the handheld controller is to be removed, the removal of the handheld controller may be completed intuitively, and an optimized using experience is thus provided.

What is claimed is:

1. A handheld controller adapted to control an electronic device, the handheld controller comprising:
   a first body adapted to be held by a user's hand;
   a second body; and
   a connecting portion, wherein the second body is connected to the first body through the connecting portion, the connecting portion is adapted to be clamped between user's fingers, and a distance between the first body and at least a portion of the second body is variable,
   wherein the second body comprises a rigid portion and an elastic portion, the rigid portion is connected to the connecting portion, the elastic portion is connected to the rigid portion and is adapted to contact a user's finger, and a distance between the first body and at least a portion of the elastic portion is variable, and
   wherein the connecting portion passes through elastic portion.

2. The handheld controller according to claim 1, wherein the rigid portion has an arc-shaped belt extension portion connected to the first body.

3. The handheld controller according to claim 2, wherein a battery is arranged in the arc-shaped belt extension portion.

4. The handheld controller according to claim 2, further comprising a plurality of light sensors disposed on the arc-shaped belt extension portion and configured to detect external light signals.

5. The handheld controller according to claim 2, further comprising a plurality of light emitters disposed on the arc-shaped belt extension portion and configured to provide light signals to the outside.

6. The handheld controller according to claim 1, further comprising a camera module disposed on the rigid portion and configured to detect the external environment.

7. The handheld controller according to claim 1, wherein the connecting portion is connected to the middle of the second body.

8. The handheld controller according to claim 1, wherein the connecting portion is connected to one side of the second body.

9. The handheld controller according to claim 1, wherein the connecting portion is rotatably connected to the first body.

10. The handheld controller according to claim 9, wherein when the user's fingers clamp the connecting portion, the first body is located at the user's palm, and the second body is located at the back of the user's palm.

11. The handheld controller according to claim 10, further comprising a camera module disposed on one side of the second body away from the back of the user's palm and configured to detect the external environment.

12. The handheld controller according to claim 1, wherein one side of the connecting portion is inserted into the first body, and a length of a portion of the connecting portion exposed outside the first body is adjustable.

13. The handheld controller according to claim 1, wherein the distance between the first body and at least the portion of the second body is less than or equal to 16 mm.

14. The handheld controller according to claim 1, wherein the connecting portion transmits a signal between the first body and the second body.

15. The handheld controller according to claim 1, wherein when the user's fingers clamp the connecting portion, the connecting portion is located between the user's middle finger and ring finger.

16. The handheld controller according to claim 1, further comprising:
   a microcontroller;
   a transmission module electrically connected to the microcontroller; and
   a positioning module electrically connected to the microcontroller, wherein when the user uses the handheld controller and moves, the positioning module transmits detected positioning information to the microcontroller and then transmits the detected positioning information to the electronic device through the transmission module.

17. The handheld controller according to claim 1, further comprising an antenna disposed in the second body and configured to transmit a signal of the handheld controller to the electronic device through the antenna.

18. The handheld controller according to claim 1, further comprising at least one sensing element disposed on the first body and configured to detect a finger position or a gesture state of the user.

* * * * *